United States Patent
Miyano et al.

(10) Patent No.: US 6,363,167 B1
(45) Date of Patent: Mar. 26, 2002

(54) METHOD FOR MEASURING SIZE OF FINE PATTERN

(75) Inventors: Yumiko Miyano, Yokohama; Fumio Komatsu, Tokyo, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/260,500

(22) Filed: Mar. 2, 1999

(30) Foreign Application Priority Data

Mar. 3, 1998 (JP) .......................................... 10-050772

(51) Int. Cl.$^7$ ................................................ G06K 9/00
(52) U.S. Cl. ...................... 382/145; 382/144; 382/203; 382/209
(58) Field of Search ................................ 382/141–149, 382/150, 151, 276, 282, 312, 181, 190, 195, 199, 203, 209; 356/401, 399, 394, 388, 237.4, 237.5; 250/200, 216, 237 R, 237 G, 491.1; 348/87, 125, 126

(56) References Cited

U.S. PATENT DOCUMENTS

| | | | | |
|---|---|---|---|---|
| 4,618,938 A | * | 10/1986 | Sandland et al. | ........... 382/148 |
| 4,648,053 A | * | 3/1987 | Fridge | .......................... 382/147 |
| 5,137,362 A | * | 8/1992 | LeBeau | ....................... 382/145 |
| 5,502,306 A | | 3/1996 | Meisburger et al. | |
| 6,047,083 A | * | 4/2000 | Mizuno | ....................... 382/141 |
| 6,072,574 A | * | 6/2000 | Zeimantz | .................. 356/237.4 |
| 6,272,393 B1 | * | 8/2001 | Steffan et al. | ............... 700/121 |

FOREIGN PATENT DOCUMENTS

| | | |
|---|---|---|
| JP | 6-181156 | 6/1994 |
| JP | 9-245709 | 9/1997 |

* cited by examiner

Primary Examiner—Joseph Mancuso
Assistant Examiner—Vikkram Bali
(74) Attorney, Agent, or Firm—Finnegan, Henderson, Farabow, Garrett & Dunner, L.L.P.

(57) ABSTRACT

A method for measuring a size of fine pattern wherein sizes of a plurality of fine patterns are measured using a scanning electron microscope is disclosed. The measuring method comprises the following procedures of obtaining a secondary electron image while scanning an electron beam on a fine pattern, determining whether or not the secondary electron image thus obtained meets a shape judgment criterion which has been set in advance, and, when the criterion is met as a result of determination processing, measuring a size of the fine pattern but, when the criterion is not met as a result of determination processing, moving to a next measurement area without measuring a size of the fine pattern.

20 Claims, 10 Drawing Sheets

METHOD FOR MEASURING SIZE OF FINE PATTERN

BACKGROUND OF THE INVENTION

The present invention relates to a method for a measuring size of fine pattern, particularly to improvement on discernment accuracy in discerning between pass and fail of fine patterns and more particularly, to automatic classification of discerned failures according to kinds.

A lithographic technique is used for forming integrated circuit patterns in a semiconductor fabrication process. In a lithographic process, photoresist patterns corresponding to patterns for forming integrated circuits are produced on a workpiece. The lithographic process is evaluated in terms of a margin in various exposure conditions (dose, focus and the like). In order to calculate the lithographic margin, dimensional data of photoresist patterns in various exposure conditions are required and automation of measurement for acquiring the dimensional data are thus indispensable.

In a conventional automatic measurement sequence, however, the accuracy of judgment between resolution and non-resolution for photoresist patterns is not sufficient. Hence, an engineer has been required to visually reconfirm resolution or non-resolution of patterns, setting a wafer in a measuring device again after the automatic measurement. Here, non-resolution means that patterns are coupled with each other, or inclined or squashed when exposure conditions are not proper. For instance, a part between a hole and a hole vanished, when a twin-holes pattern is exposed in overdosage, two holes are coupled with each other. When a lines-and-spaces pattern is exposed in overdosage, there are chances that a linewidth is narrowed, a line pattern is inclined and the thickness of a line pattern is decreased. To the contrary, when a lines-and-spaces pattern is exposed in underdosage, photoresist is left over in a space.

As a measuring device, a scanning electron microscope (SEM) is generally used. A typical example of the automatic measurement sequence is a series of steps of "movement to a measurement area, auto-focusing, pattern matching and measurement." Here, pattern matching comprises comparing an image template which has been stored in advance in the device with an SEM image of an actual wafer (sample) and determining a part which is most similar to the image template as a matching point. As an image template, an image of the very pattern to be measured or a pattern having a characteristic shape adjacent to a pattern which is desired to be measured is employed. Determination of a measuring point is conducted based on a matching point. That is, a distance between a measuring point and a matching point is input in advance and after pattern matching, a stage or a beam is moved up to the measuring point based on the distance. When the distance is "0," the matching point and the measuring point coincides with each other and movement of neither the stage nor the beam is conducted. Similarity of an SEM image to an image template is determined by a correlation coefficient. When thus obtained correlation coefficient is equal to or less than a threshold value which has been set in advance, measurement is not conducted judging that a matching error arises.

However, a conventional automatic measurement sequence has been accompanied with the following circumstances.

When exposure conditions are changed in various ways in order to calculate the above described lithographic margin, sets of measurement and evaluation are respectively required on patterns of various shapes. For the sets of measurement and evaluation, threshold values are set to rather small values. When a threshold value is set to too a low value, matching is successfully performed even on a pattern of non-resolution and measurement is conducted.

When there is at least one point which exceeds a threshold value in SEM images, the at least one point is determined as a matching point. Especially, when a template is abundant in noises, a point which is absolutely not relevant is determined as a matching point and measurement is conducted.

In a conventional automatic measurement sequence, accuracy of judgment between resolution and non-resolution, as described above, has not been sufficient and wrong size measurement data have had chances to be mixed into measurement results. Hence, as described above, after automatic measurement, an engineer has visually reconfirmed resolution or non-resolution of patterns. The confirmation work between resolution and non-resolution of patterns by eye is very complicated and requires expertise.

BRIEF SUMMARY OF THE INVENTION

The present invention has been made in consideration of the above circumstances and it is a main object of the present invention is to provide a method for a measuring size of pattern whereby accuracy of pattern matching can be improved. In addition, it is another main object of the present invention is to provide a measuring system for executing the measuring method and a storage medium in which an execution program for executing the measuring method is stored.

In order to achieve the above described objects, in the present invention, judgment on whether a fine pattern is pass or fail is effected by determining whether or not the fine pattern which has been processed to an image meets a shape judgment criterion. Thereby, accuracy of pattern matching is improved as compared with a conventional level. Since accuracy of pattern matching is thus improved, a matching point can correctly be determined and the visual reconfirmation work by an engineer which has conventionally been required can be omitted. When the reconfirmation work is omitted, a throughput in the measurement/evaluation step can also be improved.

When a fine pattern which has been processed to an image does not meet a shape judgment criterion, a size of the fine pattern are not measured and a measurement area set on a sample is moved to a next one. Hence, when a fine pattern is fail, for example, dimensional data is not attained and pass or fail can be made to respectively correspond to whether or not dimensional data are attained. Hence, a distribution state of pass and fail are quite obvious. Besides, since a measurement area is changed to a next one without measurement of a size, an improvement effect of the throughput is further increased.

In addition, when shape judgment criteria are set in a corresponding manner to various "failures," "failures" can be classified and recorded according to kinds. Such information on failure which has been recorded is useful for determination of exposure conditions and the like in an actual process, that is a fabrication process of mass produced articles. The information is also useful for evaluation of capabilities of an exposure tool.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Below, the present invention will be detailed in embodiments shown in the accompanying drawings. In the description thereof below, common parts are indicated by common reference marks through out all the figures.

(First Embodiment)

The first embodiment is an example in which it is judged whether a fine pattern is pass or fail using an image template corresponding to a pass pattern and an image template corresponding to a fail pattern.

Below, the first embodiment will be described taking up, as an example, the case where photoresist patterns for forming active areas which have been formed changing exposure conditions in various ways are evaluated and measured.

An image template (resolved template) corresponding to a pass photoresist pattern (resolved photoresist pattern) and an image template (non-resolved template) corresponding to a fail photoresist pattern (non-resolved photoresist pattern) are respectively prepared for use prior to evaluation/measurement and stored, for example, in a storage medium such as a magnetic disk.

Figure 1A:
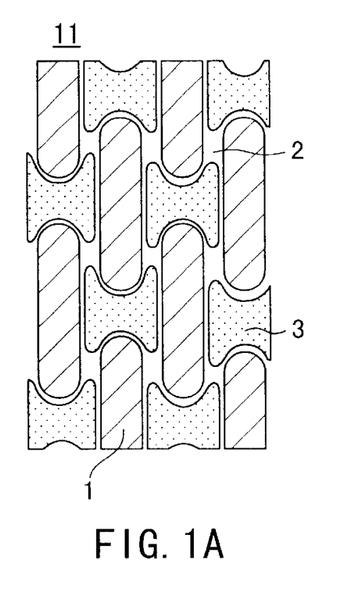
FIGS. 1A, 1B and 1C are views showing respectively examples of image template used in a first embodiment.
Figure 1B:
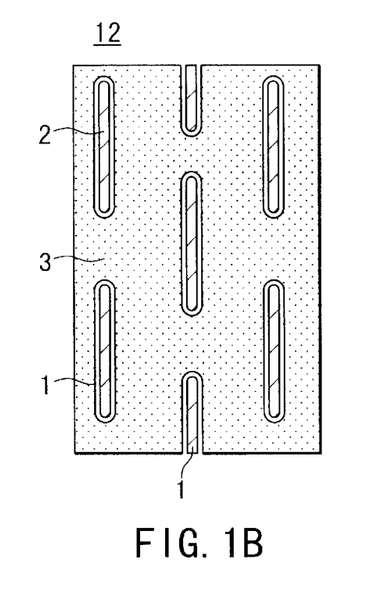
Figure 1C:
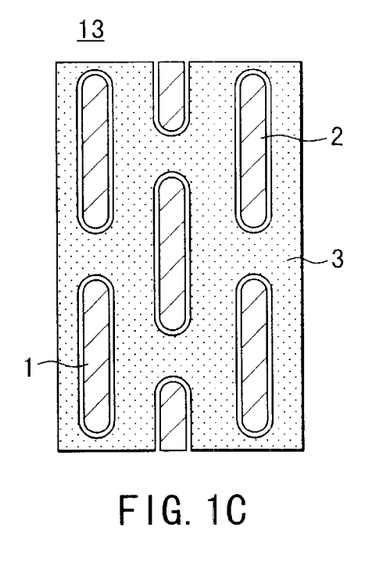

FIGS. 1A, 1B and 1C are views showing respectively examples of image template used in the first embodiment.

An image template 11 shown in FIG. 1A shows an example of a non-resolved template. The template 11 especially has larger patterns than pass patterns and the patterns correspond to a coupling state with one another and such a state is called as "resist remaining" which is easy to occur in underdosage.

An image template 12 shown in FIG. 1B shows another example of a non-resolved template. Especially the template 12 corresponds to a state of patterns which become smaller than pass patterns. The state of the smaller patterns is called "resist slimming" or "resist thinning", which is easy to occur in overdosage.

An image template 13 shown in FIG. 1C shows a resolved template. The state of the resolved template is obtainable when an exposure dose and other exposure conditions are proper.

The templates 11 to 13 are made from images (SEM image) using a scanning electron microscope on patterns prepared actually or images obtained by lithography simulation from CAD data of photomasks (reticles).

When the templates are made from SEM images, they are easy to be made since SEM images of patterns prepared actually are used. In this case, various templates can be prepared according to a sample substance (photoresist substance), observation conditions and the like.

When the templates are made from images obtained by lithography simulation, they are prepared at a low cost and with a high degree of general versatility since they can be obtainable without fabrication of actual patterns.

In FIGS. 1A to 1C, a reference numeral 1 indicates a secondary electron image obtained from a photoresist pattern, a reference numeral 2 indicates a secondary electron image obtained from an edge of a photoresist pattern and a reference numeral 3 indicates a secondary electron image obtained from a part other than the photoresist patterns (a substrate).

Figure 2:
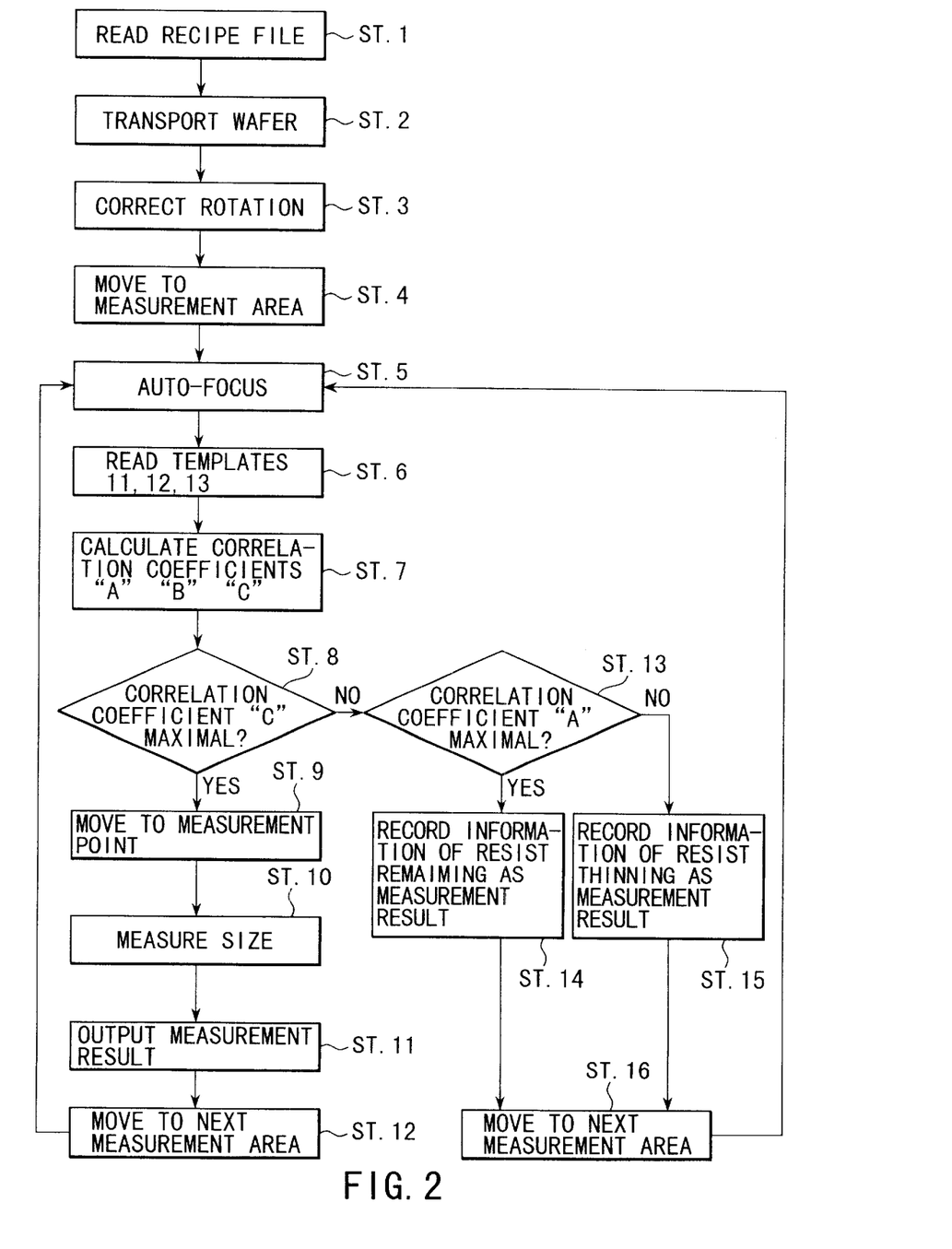
FIG. 2 is a flow chart showing a measurement sequence pertaining to the first embodiment.
Figure 3:
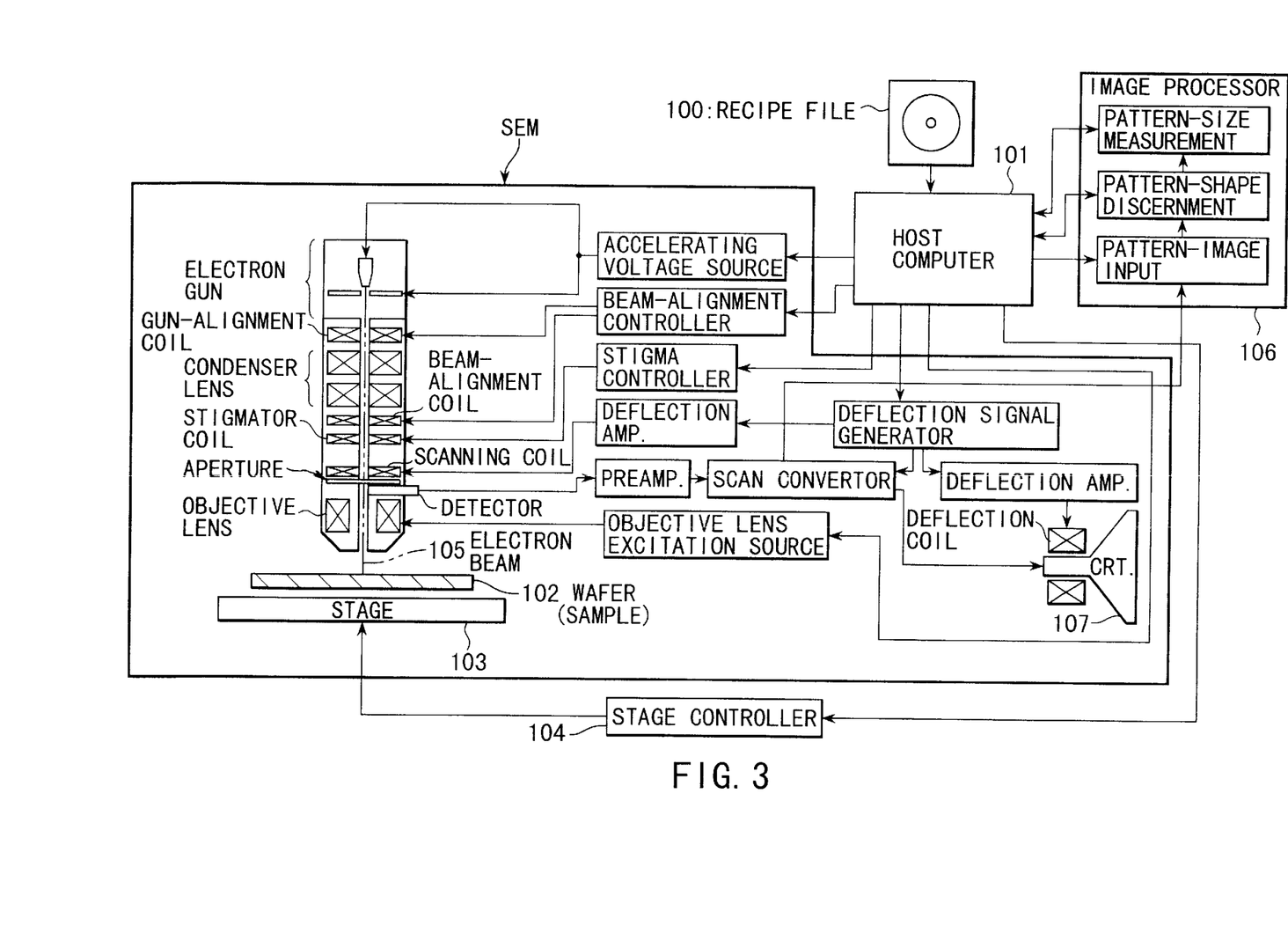
FIG. 3 is a block diagram showing a configuration example of a measuring system.

FIG. 2 is a flow chart showing a measurement sequence pertaining to the first embodiment of the present invention and FIG. 3 is a block diagram showing a configuration example of a measuring system.

The measurement sequence shown in FIG. 2 is stored, for example, in a storage medium 100 such as a magnetic disk as an execution program. Actual measurement is realized by a computer 101 whose operation is controlled by the execution program. In the storage medium, information necessary for the measurement such as templates 11 to 13, measurement points which are targets for a plurality of measuring areas set on wafers in addition to the execution program is stored. In this specification, the execution program, templates, other information necessary for the measurement and the like are hereafter called a measurement recipe and the storage medium 100 in which measurement recipes are stored is hereinafter called a recipe file. The recipe file 100 is prepared for each fine pattern in measurement.

A measurement sequence pertaining to the first embodiment will be described.

As shown in FIG. 2, fist of all, the recipe file 100 is selected according to a fine pattern in measurement. In the example, a recipe file 100 for forming an active area is selected. Thereafter, the selected recipe file 100 is read by the computer 101 (ST. 1). Then, a wafer (sample) 102 on which a photoresist pattern for forming an active area has been fabricated is transported into a specimen chamber of an SEM (an observation tool) (ST. 2). The wafer 102 is placed on a stage 103. Then rotation of the wafer 102 is corrected by an alignment operation (ST. 3). Then, the stage 103 is in a controlling manner moved to one of measurement areas recorded in the recipe file 100 by a stage controller 104 (ST. 4). Thereby, an observation field of an SEM is shifted onto a measurement area of the wafer 102. Then scanning an electron beam 105 is conducted across the measurement area and photoresist patterns present in the measurement area are processed to an SEM image. In formation of the SEM image, focusing, magnification and the like are automatically adjusted (auto-focusing, ST. 5).

Then, the templates 11 to 13 are read into an image processor 106 (ST. 6). Thereafter, the SEM image obtained in ST. 5 (actual SEM image) is read into the image processor 106 and the actual SEM image is subjected to pattern matching with each of the templates 11 to 13. At this point, when the pattern matching of the actual SEM image with the templates are all performed in parallel, a processing time is of the same order as conventional pattern matching. Thereafter, calculations are performed on a correlation coefficient "A" between the actual SEM image and the template 11, a correlation coefficient "B" between the actual SEM image and the template 12 and a correlation coefficient "C" between the actual SEM image and the template 13 (ST. 7). Thereafter, it is determined whether or not the correlation coefficient "C" is maximal in order to judge that the photoresist pattern is resolved (ST. 8).

In ST. 8, when determination of "being maximal" is obtained (YES), it is regarded that the photoresist pattern is most similar to the template 13. As a result, it is judged that the photoresist pattern is resolved. Then, the electron beam 105 or the stage 103 is moved to a measuring point (ST. 9). Thereafter, at the measuring point, a size of the photoresist pattern is measured (ST. 10). Then, measured dimensional data are recorded as a measurement result and the measurement result is send out as output (ST. 11). The measurement result is displayed, for instance, on a wafer map of a display 107.

After processing in ST. 11, the stage 103 is moved onto a next measurement area under control by the stage controller 104 (ST. 12). Thereby, an SEM observation field is also moved onto a next measurement area of the wafer 102. Thereafter, ST. 5 and the following steps thereof are repeated in the next measurement area.

In ST. 8, when determination of "not being maximal" is obtained (NO), it is judged that the photoresist pattern is not resolved. In the first embodiment, when "not resolving" is judged, size measurement is not conducted. However, failures of photoresist patterns are classified into groups according to kinds thereof. Hence, it is determined whether or not the correlation coefficient "A" is maximal (ST. 13).

In ST. 13, when determination of "being maximal" is obtained (YES), it is judged that the photoresist pattern is most similar to the template 11. As a result, a failure of the photoresist pattern is classified into a group of "resist remaining." Thereafter, information of "resist remaining" is recorded as a measurement result (ST. 14).

In ST. 13, when "being not maximal" is judged (NO), the photoresist pattern is most similar to the template 12. As a result, a failure of the photoresist pattern is classified into a group of "resist thinning." Thereafter, information of "resist thinning" is recorded as a measurement result. (ST. 15).

The information on failure obtained in ST. 13 is presented on the wafer map of the display 107, for instance, as "no dimensional data" or in "a kind of failure" and a shot of non-resolution is visualized. Since the shot of non-resolution is visualized, discernment between resolution and non-resolution of a shot in exposure conditions for evaluation or a shape of the photoresist is clearly grasped at first glance. In addition, kinds of failures are automatically classified.

After processing in ST. 14 or ST. 15, the stage controller 104 is driven to move the stage 103 to a next measurement area (ST. 16). Thereby, an observation field of the SEM is moved onto a next measurement area of the wafer 102. Thereafter, ST. 5 and the following steps thereof are repeated at the next measurement area.

According to the first embodiment, correlation coefficients between the actual SEM image and a plurality of image templates are calculated and the coefficients are compared with one another to determine a matching point. Hence, accuracy of automatic judgment between resolution and non-resolution is increased. Therefore, no circumstances in which wrong size measurement results are mixed into correct ones are not brought about and improvement on accuracy of a dose and a focus margin which are calculated based on the measurement results can be achieved.

For a shot of non-resolution, no measurement processing is performed and no requirements for confirmation works by an engineer, so that a throughput can be improved.

The non-resolved templates 11, 12 respectively corresponding to overdosage and underdosage are prepared for use in the first embodiment. Non-resolved templates can, however, be prepared for deteriorated shapes caused by various factors such as not only exposure doses but differences in exposure conditions or other processing conditions for photoresist and the like. When non-resolved templates which respectively correspond to various deteriorated shapes are prepared and a actual SEM image is compared with the non-resolved templates, deteriorated photoresist patterns can be screened with more of certainty. Besides, when templates corresponding to various deteriorated shapes are prepared, the number of kinds according to which failures can be classified can advantageously be increased.

(Second Embodiment)

The second embodiment is an example in which whether a fine pattern is pass or fail is judged using a subtracted image between an image template corresponding to a standard pattern and an actual SEM image.

Below, the second embodiment will be described taking up, as an example, the case where hole patterns fabricated in exposure conditions which are changed in various ways are evaluated/measured.

Figure 4:
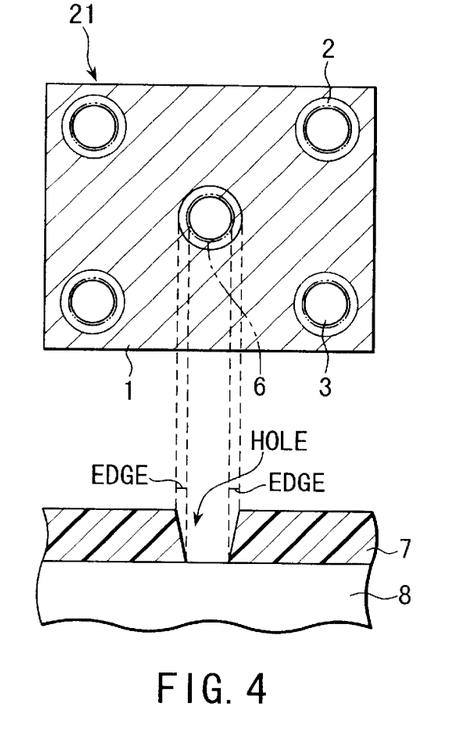
FIG. 4 is a view showing an image template used in a second embodiment.

FIG. 4 is a view showing an image template example used in the second embodiment of the present invention.

An image template 21 shown in FIG. 4 corresponds with a standard pattern and in a concrete manner, corresponds with a resolved template. In FIG. 4, a relation of correspondence between an image and an actual pattern for reference is shown.

A measurement sequence pertaining to the second embodiment will be described.

Figure 5:
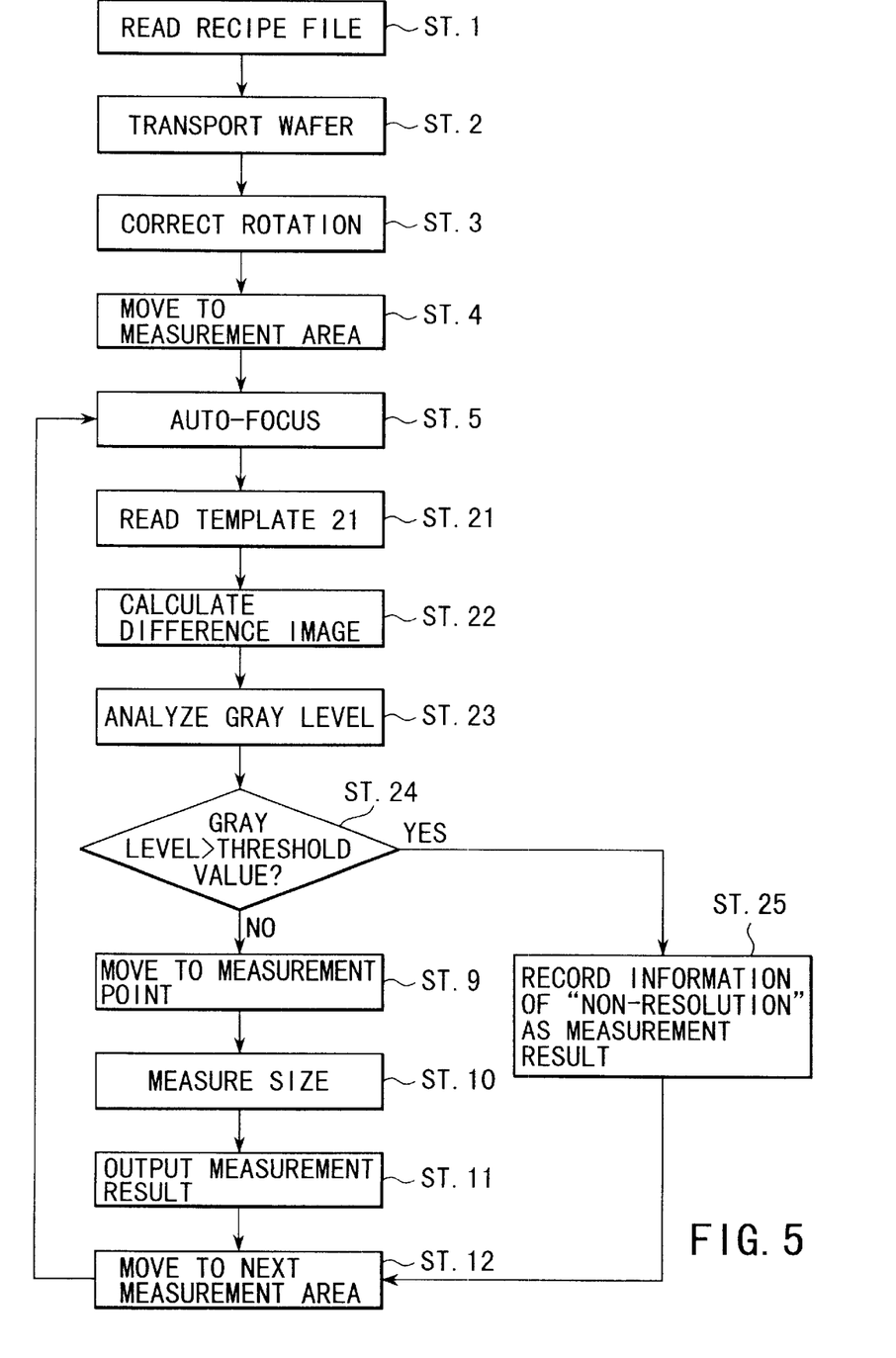
FIG. 5 is a flow chart showing a measurement sequence pertaining to the second embodiment.

FIG. 5 is a flow chart showing the measurement sequence pertaining to the second embodiment.

Figure 6:
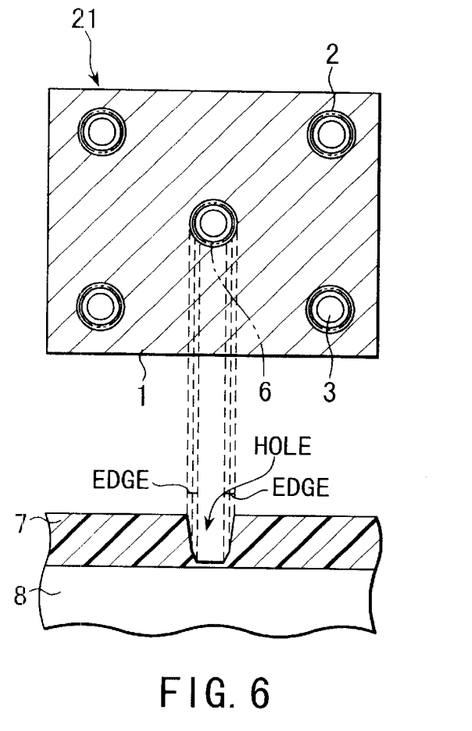
FIG. 6 is a view showing an SEM image.

As shown in FIG. 5, first of all, a recipe file is selected according to a fine pattern in measurement. In this example, a recipe file for a hole pattern is selected. Thereafter, steps of ST. 1 to ST. 4 are performed as in the first embodiment and in ST. 5, a photoresist pattern present at a measurement area is processed to an SEM image. Thus obtained SEM image is shown in FIG. 6. The SEM image 22 shown in FIG.

6 is obtained from a shot of a non-resolved photoresist pattern. In a concrete manner, the shot is "a resist remaining in a hole" which is apt to arise in underdosage.

Figure 7:
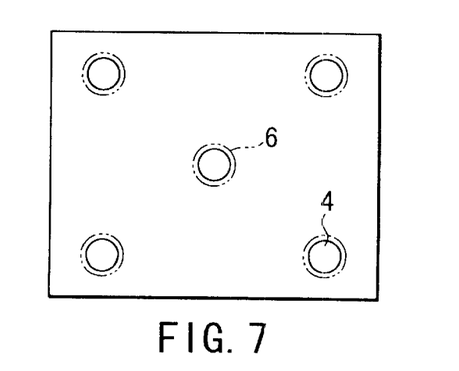
FIG. 7 is a view showing a subtracted image.

Then, the template 21 is read into the image processor (ST. 21). Then, the SEM image 22 is read into the image processor and a subtract image between the SEM image 22 and the template 21 is calculated (ST. 22). The subtracted image obtained here is shown in FIG. 7. As shown in FIG. 7, the subtracted image 4 is obtained in correspondence to holes formed in the photoresist 7. The subtracted image 4 is subtracted a gray level of an area 3 of the template 21 from a gray level of an area 3' of the SEM image 22. As a result, the gray level of the subtracted image 4 is changed according to a gray level of the area 3'. Then, the gray level of the subtracted image 4 is analyzed (ST. 23). When a part in which "resist remaining in a hole" arises, such as a hole pattern, especially a pattern for forming a contact hole, can be specified in advance, an area 6 where a gray level is analyzed may be specified in advance as shown in FIG. 4. In the means time, areas 6 are respectively shown in FIGS. 6, 7. Thereafter, it is determined whether or not a gray level of the subtracted image exceeds a preset threshold (ST. 24).

In ST. 24, when determination of "no exceeding" is obtained (NO), it is judged that the photoresist pattern is resolved. Thereafter, program flow goes to ST. 12 after the steps of ST. 9 to ST. 11 are performed as in the first embodiment and ST. 5 and the following steps thereof are repeated at a next measurement area.

In ST. 24, when determination of "exceeding" is obtained (YES), it is judged that the photoresist pattern is not resolved. Thereafter, information of "non-resolution" or "resist remaining in a hole" is recorded as a measurement result (ST. 25). The measurement result obtained in ST. 24 is presented on a wafer map of the display and a shot of non-resolution is visualized. Then, program goes to ST. 12 and ST. 5 and the following steps thereof are repeated at a next measuring area.

According to the second embodiment, a subtracted image between an image template and an SEM image is obtained and a gray level of the difference image is compared with a threshold value. Hence, accuracy of automatic judgment between resolution and non-resolution is increased. Especially since the second embodiment is to compare a gray level of a difference image with a threshold value, failures such as "resist remaining in a hole" which has difficulty in judgment between resolution and non-resolution based on similarity between patterns can be discerned with certainty.

Besides, since a gray level of a subtracted image is compared with a threshold value, there can be an advantage that a processing time can be shortened as compared with a sequence including a step of calculating a correlation coefficient.

For a shot of non-resolution, measurement processing is not conducted in a similar way to the first embodiment, and in addition, there is no necessity for an engineer to perform a reconfirmation work, which enables a throughout to be improved.

(Third Embodiment)

The embodiment is an example, where information corresponding to a contour of a fine pattern is extracted from an actual SEM image and it is judged whether the fine pattern is pass or fail by analyzing the information.

First of all, an example of a method of extracting a contour of a fine pattern from an SEM image will be described.

Figure 8A:
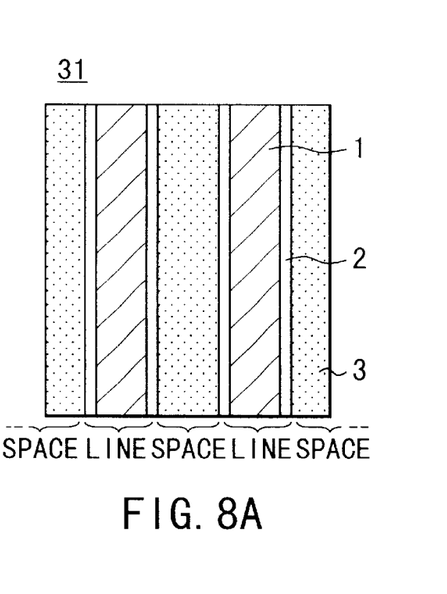
FIGS. 8A and 8B are views respectively showing SEM images.
Figure 8B:
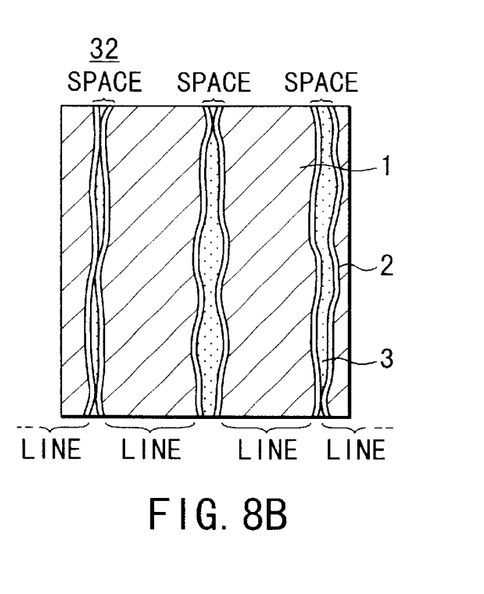
Figure 9A:
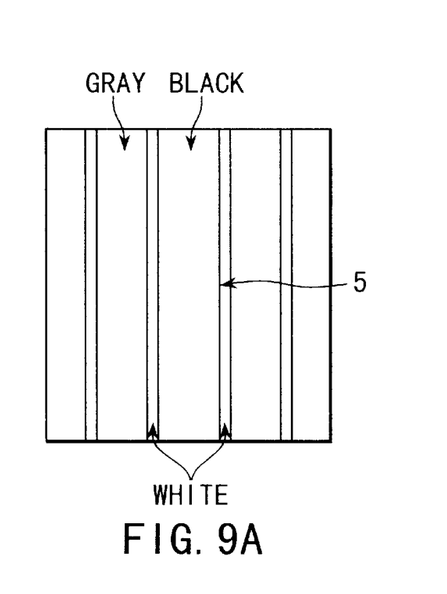
FIGS. 9A and 9B are views respectively showing SEM images translated to three-valued data.
Figure 9B:
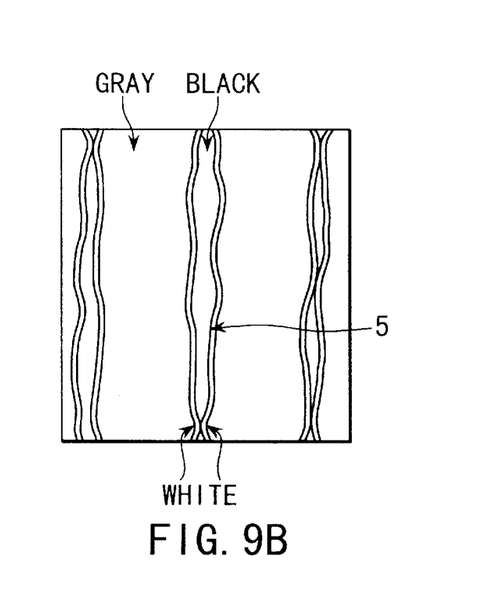

FIGS. 8A and 8B are views respectively showing SEM images and FIGS. 9A and 9B are views respectively showing contours extracted from the SEM images.

As shown in FIGS. 8A, 8B, signal intensities in an SEM image are usually different from place to place: a pattern surface (with a reference mark 1), tapered portion of a pattern (with a reference mark 2) and a pattern bottom (with a reference mark 3). Hence, three-valued data translation processing is suitable for extraction of a contour as a method for extracting a contour.

In this method, after an area in which extraction of a contour is conducted is designated, processing for three-valued data translation is conducted in the designated area. An area in which a contour is extracted is stored, for instance, in a recipe file as information. Threshold values for processing for three-valued data translation are obtained from histogram processing. Images subjected to three-valued data translation are shown in FIGS. 9A, 9B. As shown in FIGS. 9A, 9B, image pixels are classified into three kinds of "BLACK", "WHITE" and "GRAY" in gray level. Thereafter, a boundary between "BLACK" and "WHITE" or a boundary between "WHITE" and "GRAY" is defined as "contour." Which of the boundaries is defined as "contour" may be determined according to a substance of a sample (a substance of a fine pattern) and a state of contrast in the image based on its shape and conditions.

As one of other methods, there is a method in which differentiation processing on an image is performed in a designated area and a "contour" is determined to be a line which is made by connecting points in the image at which the highest gradient of change in gray level is shown.

Below, the third embodiment will be described taking up, as an example, the case where lines-and-spaces patterns (hereinafter referred to as L/S pattern) fabricated in various exposure conditions are evaluated/measured.

Figure 10:
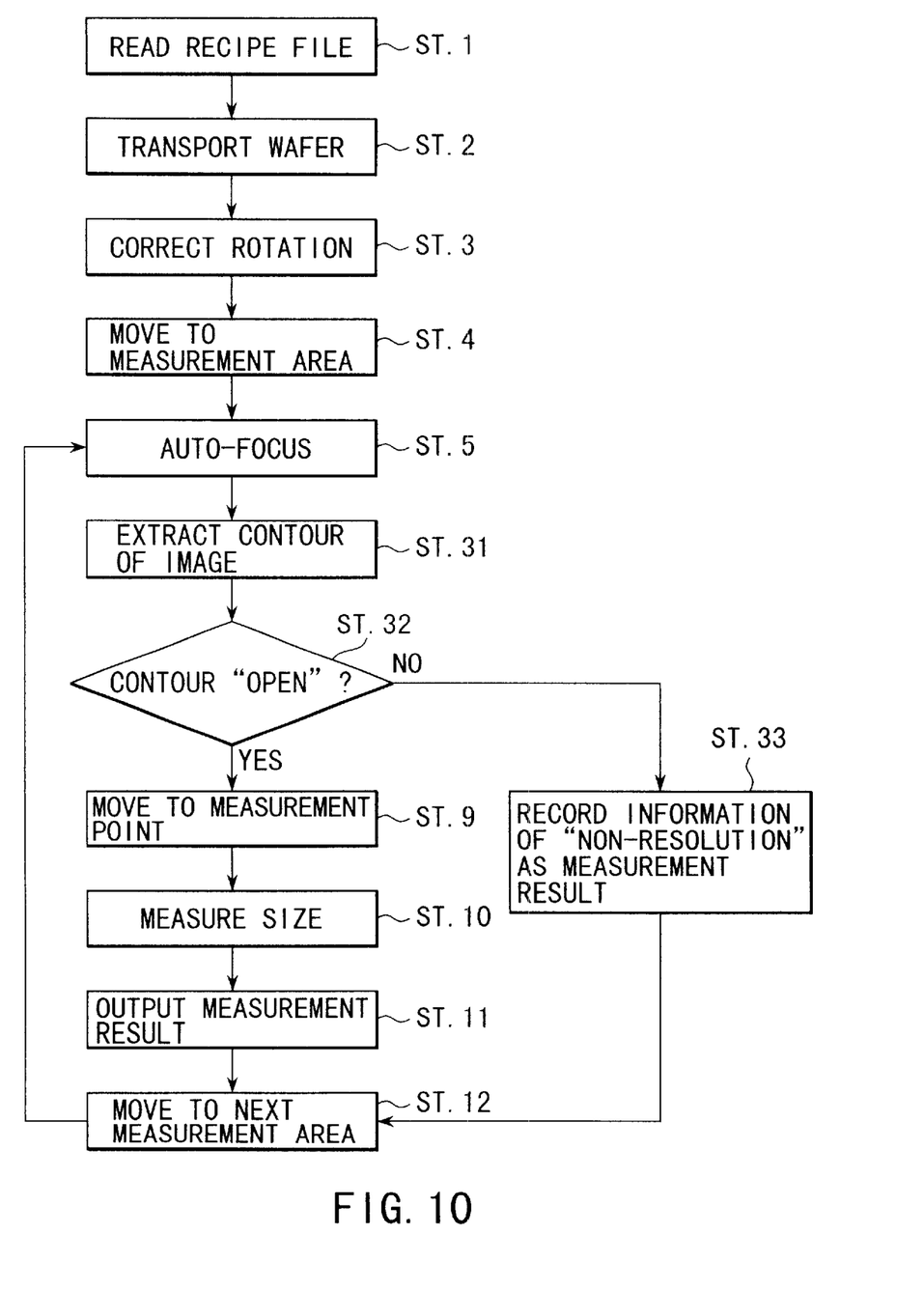
FIG. 10 is a flow chart showing a measurement sequence pertaining to a third embodiment.

As shown in FIG. 10, first of all a recipe file is selected according to a fine pattern in measurement. In the example, a recipe file for an L/S pattern is selected. Below, the steps from ST. 1 to ST. 4 are performed as in the first embodiment and in ST. 5, a photoresist pattern included in a measurement area is processed to an SEM image. FIGS. 8A, 8B described above show images obtained in ST. 5. The SEM image 31 shown in FIG. 8A is a shot of a resolved photoresist pattern. The SEM image 32 shown in FIG. 8B is a shot of a non-resolved photoresist pattern. In a concrete manner, the SEM image 32 is a shot of a "resist remaining in a space" which is apt to arise in underdosage.

Then, the SEM image (31 or 32) is read into the image processor and a contour is extracted using the above described method (ST. 31). The SEM image which is a shot of a resolved photoresist pattern is subjected to three-valued data translation, so that the SEM image shown in FIG. 9A is obtained. On the other hand, the SEM image 32 which is a shot of a non-resolved photoresist pattern is subjected to three-valued data translation, so that the SEM image shown in FIG. 9B is obtained. Lines 5 in FIGS. 9A, 9B indicate contours and correspond to boundaries between the photoresists 1 and the substrates 3. In the example, boundaries between "BLACK" and "WHITE" are adopted as the contours 5. An intensity of an image of a "resist remaining" is generally weak as compared with a intensity of a photoresist pattern, but the boundary can be extracted as a contour when a lower threshold is employed. Then, a contour shown in FIG. 9A and a contour shown in FIG. 9B will be compared with each other. In the case of a resolved photoresist pattern shown in FIG. 9A, contours 5 does not intersect one another, which is defined as "OPEN." In the case of a non-resolved photoresist pattern, on the other hand, contours 5 intersect one another and partly form a "closed area" or a "half closed area," which is defined as "CLOSE." In ST. 32, when this phenomenon is utilized and it is investigated whether a contour is "OPEN" or "CLOSE," judgment between resolution and non-resolution can be done.

In ST. 32, when determination of "OPEN" is obtained (YES), it is judged that a photoresist pattern is resolved. Thereafter, in a similar manner to the first embodiment, after the steps of ST. 9 to ST. 11 are performed, program flow goes to ST. 12 and ST. 5 and the following steps thereof are repeated at a next measurement area.

In ST. 32, when determination of "CLOSE" is obtained (NO), it is judged that a photoresist pattern is not resolved. Thereafter, information of "non-resolution" or "resist remaining in a space" is recorded as a measurement result (ST. 33). The measurement result obtained in ST. 32 is presented on a wafer map of the display and a non-resolution shot is visualized. Then, program goes to ST. 12, and ST. 5 and the following steps thereof are repeated at a next measuring area.

According to the third embodiment, when it is investigated whether a contour extracted from an SEM image is "OPEN" or "CLOSE," in a similar manner to the first and second embodiments, accuracy of automatic judgment between resolution and non-resolution can be improved and a throughput can also be improved. Especially in the third embodiment, an SEM image itself is not employed but a contour which is extracted from the SEM image is employed. A volume of information showing a contour is smaller than a volume of information showing an SEM image which is a secondary electron image. Hence, the third embodiment can be processed in a shorter time than the first and second embodiments. Besides, since a smaller volume of information enables a probability of erred judgment to be less.

Lines 5 which are defined by contours of patterns are investigated about whether the lines 5 constitute a "closed area" or a "half closed area." Hence, judgment on whether or not patterns are separated from each other or coupled with each other is automatically performed.

Besides, since a contour in a secured manner reflects a pattern shape, there is an advantage that a change in a pattern shape caused by a difference in processing conditions can be identified with certainty.

(Fourth Embodiment)

The fourth embodiment is an example in which information corresponding to a contour of a fine pattern is extracted from an actual SEM image and it is judged whether an actual fine pattern is pass or fail by analyzing the information as in the third embodiment.

Below, the fourth embodiment will be described taking up, as an example, the case where twin-holes patterns prepared in various exposure conditions are evaluated and measured in the third embodiment.

Figure 11:
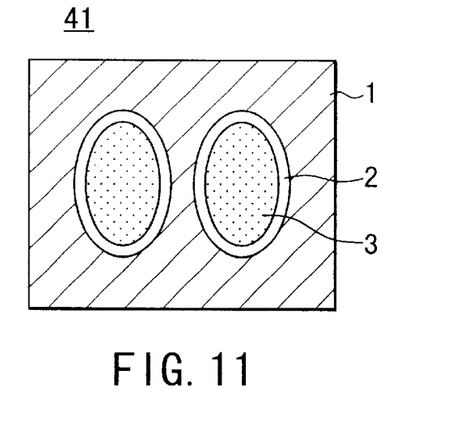
FIG. 11 is a view showing an SEM image.
Figure 12:
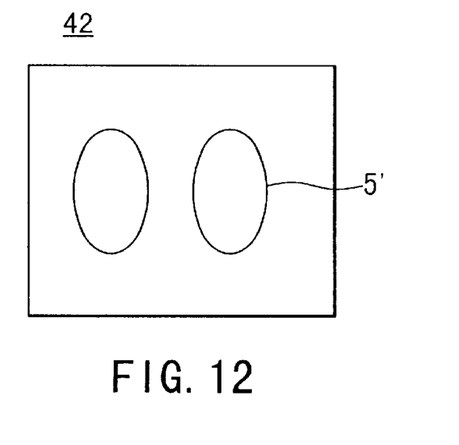
FIG. 12 is a view showing a contour extracted from an SEM image.

Prior to the evaluation/measurement, contours 5', as shown in FIG. 12, are extracted from an SEM image 41 of a resolved photoresist pattern shown in FIG. 11 and standard pattern data 42 are prepared in advance. The contours 5' are extracted by the method described in the third embodiment. The contours 5' are not required to be obtained from an SEM image of a resolved photoresist pattern but lithographic simulation is applied to CAD data of a mask and contours 5' may be acquired from the simulation result.

Figure 13:
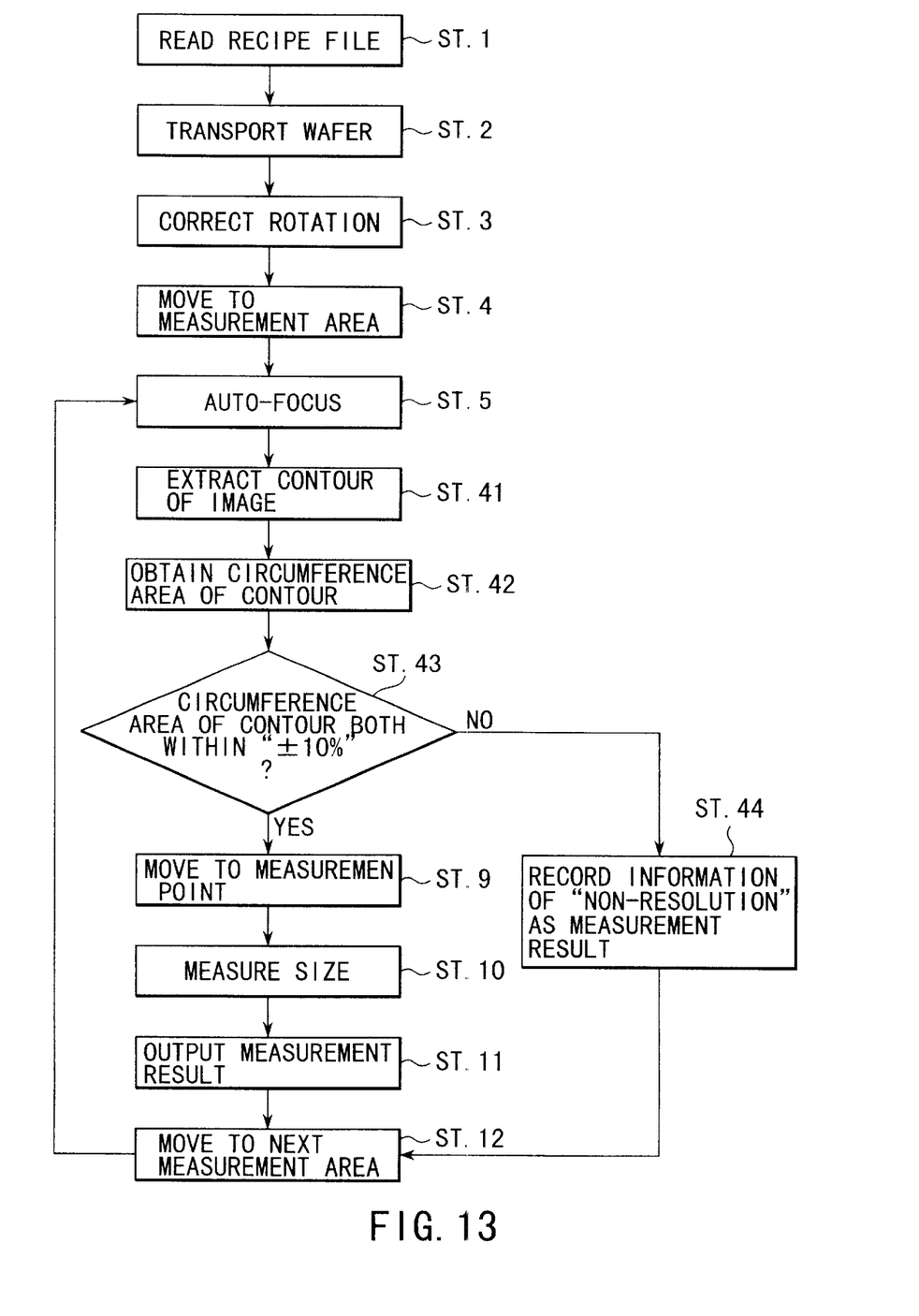
FIG. 13 is a flow chart showing a measurement sequence pertaining to a fourth embodiment.

FIG. 13 is a flow chart showing a measurement sequence pertaining to the fourth embodiment.

Figure 14:
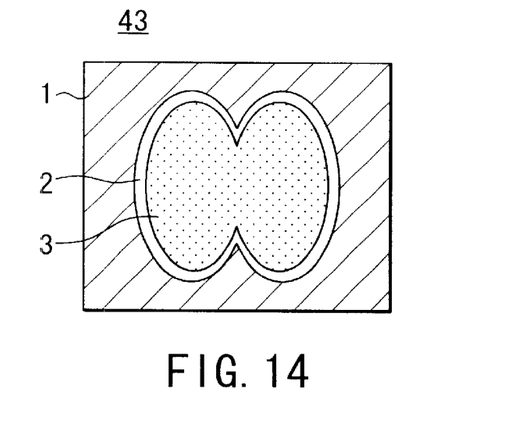
FIG. 14 is a view showing an SEM image.

As shown in FIG. 13, first of all, a recipe file is selected according to a fine pattern in measurement. In the example, a recipe file for a twin-holes pattern is selected. Thereafter, the steps from ST. 1 to ST. 4 are performed in a similar manner to the first embodiment and in ST. 5, a photoresist pattern present in a measurement area is processed to an SEM image. The SEM image obtained here is shown in FIG. 14. The SEM image 43 shown in FIG. 14 is a shot of a non-resolved photoresist pattern. In a concrete manner, a "hole coupling" which is apt to arise in overdosage is taken as the shot.

Figure 15:
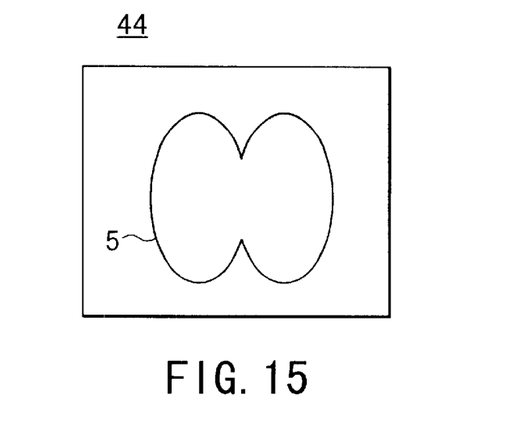
FIG. 15 is a view showing a contour extracted from an SEM image.

Then, standard pattern data 42 and the SEM image 43 are read into the image processor. Thereafter, a contour 5 is extracted from the SEM image 43 as shown in FIG. 15 to obtain actual pattern data 44 (ST. 41). Then, a total length (a total perimeter) of the contours 5' and a total measurement of the areas enveloped by the contours 5' are obtained from the standard pattern data 42. Besides, a length (a perimeter) of the contour 5 and a measurement of the area enveloped by the contour 5 are obtained from the actual pattern data 44 (which is called labeling processing, ST. 42). When the actual pattern data are of non-resolution, the perimeter and area measurement both are respectively nearly twice as large as those of the standard pattern data 42. Here, in the case where the actual pattern data 44 is of non-resolution, when the perimeter and area measurement of the actual pattern data 44 both respectively assume a length and an area measurement within ±10% of those of the standard pattern data 42, the actual pattern is set as good and when one of the perimeter and area measurement is outside the range of ±10% of the corresponding one of those of the standard pattern data 42, the actual pattern is set as fail.

In ST. 43, when determination of "the perimeter and area measurement both being within ±10%" is obtained (YES), it is judged that the photoresist pattern is resolved. Thereafter, program flow goes to ST. 12 after processing from ST. 9 to ST. 11 is performed as in a similar manner to the first embodiment and processing in ST. 5 and the following steps thereof is repeated at a next measurement area.

In ST. 43, when determination of "one of the perimeter and area measurement being outside ±10%" is obtained (NO), it is judged that the photoresist pattern is not resolved. Thereafter, information of "non-resolution" is recorded as a measurement result (ST. 44). The measurement result obtained in ST. 43 is presented on a wafer map of the display and a shot of non-resolution is thus visualized. Then, program goes to ST. 12 and ST. 5 and the following steps thereof are repeated at a next measurement area.

According to the fourth embodiment, when a perimeter of a contour 5 extracted from an SEM image and a measurement of an area which is enveloped by the contour 5 are respectively compared with those of standard pattern data, accuracy of automatic judgment between resolution and non-resolution can be increased and a throughput can also be improved as in the first to third embodiments. Besides, especially in the fourth embodiment, since a circumferential length of a contour 5 extracted from an SEM image and a measurement of an area enveloped by the contour 5 are utilized, a change in pattern shape caused by a difference in processing conditions can quantitatively be measured, so that judgment on pattern shapes can be performed with more of certainty.

(Fifth Embodiment)

The above described first through fourth embodiments are shown, for example, in examples in each of which the present invention is applied for evaluation of a lithographic process. However, results of automatic judgment are also used for evaluation of capabilities of an exposure tool shown in FIG. 16 instead of the evaluation of a lithographic process.

Figure 16:
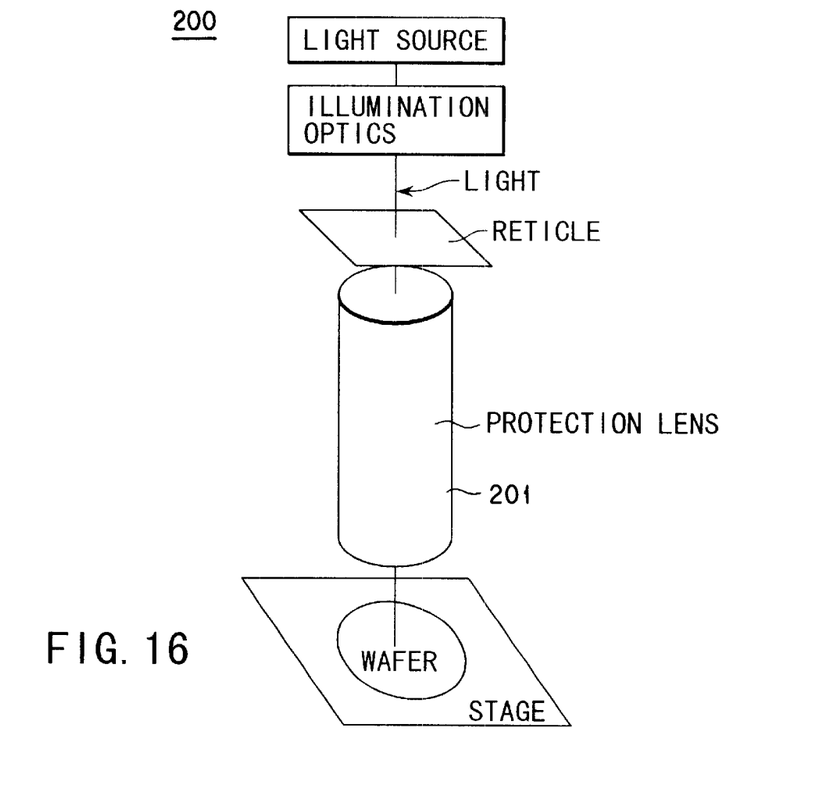
FIG. 16 is a view showing a configuration example of an exposure system.
Figure 17A:
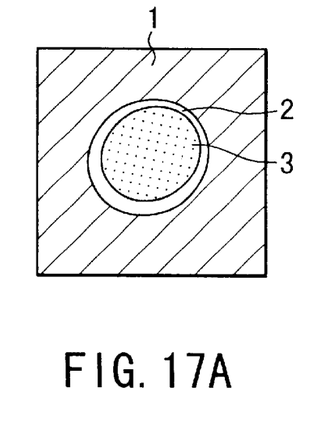
FIGS. 17A, 17B and 17C are views respectively showing SEM images.
Figure 17B:
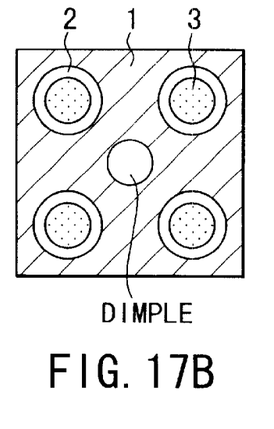
Figure 17C:
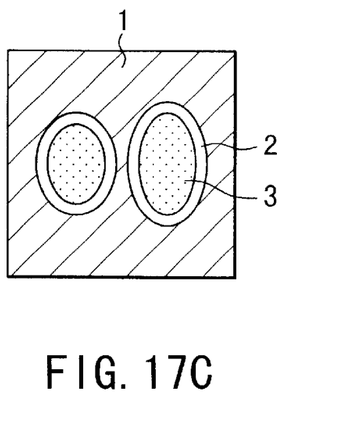

When, for example, a projection lens 201 of an exposure tool 200 has an aberration, changes in shape of photoresist patterns appear in accordance with aberrations: distortion of a hole pattern shown in FIG. 17A, a dimple in an area between hole patterns shown in FIG. 17B, asymmetry in shape of a twin-holes pattern shown in FIG. 17C and the like.

The distortion shown in FIG. 17A can be measured by procedures of extracting a contour of a hole pattern, measuring a perimeter and the out-of-roundness and comparing of the measurement results with a threshold value and standard pattern data, for example, according to the fourth embodiment.

Occurrence of the dimple shown in FIG. 17B, asymmetry in shape shown in FIG. 17C and the like can be measured by obtaining a subtracted image according to the second embodiment.

Accordingly, information on whether or not the projection lens 201 has an aberration can be obtained from the above measurement results.

Information on failures which are obtained in the first to fourth embodiments and are classified, for example, can also be fed back in determination of exposure conditions for an actual process, that is a mass production process. For example, in the second embodiment, when "resist remaining in a space" is recognized, the information can be fed back to a developing time and an exposure dose if a step prior to a measurement step is a photolithographic step and the information can be fed back to an etching time and the like if a step prior to a measurement step is an etching step. Accordingly, the present invention is useful for setting of conditions or the like for a fabrication process of mass produced articles.

While the present invention has been described in the first to fifth embodiments, the present invention is not limited to the first to fifth embodiments but various changes and modification thereof are possible without any departure from the spirit and scope of the present invention.

For example, the first to fifth embodiments are not necessarily required to be singly performed but can be combined in a proper manner. When a shape of a fine pattern is anticipated, a criterion for judgment may be changed according to the shape of a fine pattern. The embodiments and modifications thereof can naturally be used for a size measurement of a pattern made of any of various kinds of substance while not being limited to a photoresist pattern. As a measuring device, a scanning electron microscope has been used, but other measuring devices may be applied instead. Measurement sequences according to the present invention can be applied for various devices writing as a program, which can be executed by a computer, in a storage medium such as a magnetic disk (a floppy disk, a hard disk and the like), an optical disk, (CD-ROM, CD-RAM, DVD and the like), a semiconductor memory and the like, and furthermore, transmitting as the program through a communication medium as well. A computer which realizes the present invention reads a program stored in a storage medium and operations are controlled by the program so as to execute the above described processing.

Again, it is confirmed that the present invention can be executed in various changes and modifications of the above described embodiments without departing from the spirit and scope of the present invention as hereinafter claimed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for measuring a size of fine pattern, comprising steps of:
   (a) moving an observation field of an observation device onto one measurement area of a plurality of measurement areas set on a sample;
   (b) imaging a fine pattern present in the one measurement area using the observation device;
   (c) determining whether or not the fine pattern meets a shape judgment criterion;
   (d) measuring a size of the fine pattern when the shape judgment criterion is met as a result of the step (c) and thereafter, moving the observation field to another measurement area from the one measurement area; and
   (e) moving the observation field to another measurement area from the one measurement area without measuring a size of the fine pattern when the shape judgment criterion is not met as a result of the step (c).

2. A method according to claim 1, wherein in the step (e), failures of the fine pattern are classified into groups according to kinds thereof, on the based on a result of the step (c), and information on the classified failures are recorded.

3. A method according to claim 2, wherein the failures include coupling between patterns, and inclination or squashing of a pattern.

4. A method according to claim 2, wherein the observation device is a scanning electron microscope.

5. A method according to claim 4, wherein a first image template corresponding to a pass pattern and a second image template corresponding to a fail pattern are prepared;
   in the step (c), similarity between the image of the fine pattern and the first image template, and similarity between the image of the fine pattern and the second image template are respectively obtained and compared with each other; and
   it is determined based on a comparison result whether or not the fine pattern meets the shape judgment criterion.

6. A method according to claim 5, wherein the first and second image templates are SEM images using a scanning electron microscope on fine patterns prepared actually.

7. A method according to claim 5, wherein the first and second image templates are images obtained by calculation from mask data.

8. A method according to claim 4, wherein an image template corresponding to a pass pattern is prepared;
   in the step (c), a subtracted image between the image of the fine pattern and the image template is obtained and it is analyzed whether or not the difference is a threshold value or more; and
   it is determined based on an analytical result whether or not the fine pattern meets the shape judgment criterion.

9. A method according to claim 4, wherein in the step (c), information corresponding to a contour of the fine pattern is extracted from the image of the fine pattern and it is determined based on the information whether or not the fine pattern meets the shape judgment criterion.

10. A method according to claim 9, wherein the information corresponding to a contour is a line which is defined by the contour of the fine pattern, it is investigated whether or not the line forms at least one of half closed and closed areas and it is determined, based on whether or not at least one of a half closed area and a closed area is present, whether or not the fine pattern meets the shape judgment criterion.

11. A method according to claim 9, wherein the information corresponding to a contour is a line which is defined by the contour of the fine pattern, a perimeter of the line and an area surrounded by the line are obtained and it is determined, based on whether or not at least one of the perimeter and the area exceeds a standard, whether or not the fine pattern meets the shape judgment criterion.

12. A method according to claim 2, wherein the fine pattern is a photoresist pattern.

13. A method according to claim 12, wherein capabilities of an exposure tool are estimated based on the recorded information on failures.

14. A method according to claim 13, wherein the capabilities of an exposure tool are estimated using distortion of the photoresist pattern.

15. A method according to claim 13, wherein the capabilities of an exposure tool are estimated using a defect of the photoresist pattern.

16. A method according to claim 2, wherein the recorded information on failures is fed back to a fabrication process of mass produced articles.

17. A system for measuring a fine pattern, comprising:
an observation device for imaging a fine pattern formed on a sample;
a moving device for moving an observation field of the observation device to one of a plurality of measurement areas set on the sample;
an image processor including shape determining device for determining whether or not the image of the fine pattern meets a shape judgment criterion and measuring device for measuring a size of the fine pattern; and
a control device which executes the following instructions of:
(a) moving the observation field to the one measurement area by the moving device;
(b) imaging the fine pattern present in the one measurement area by the observation device;
(c) determining whether or not the fine pattern meets a shape judgment criterion by the shape determining device;
(d) measuring a size of the fine pattern by the measuring device when the shape judgment criterion is met as a result in the step (c) and thereafter moving the observation field to another measurement area from the one measurement area by the moving device; and
(e) moving the observation field to another measurement area from the one measurement area by the moving device without measuring a size of the fine pattern by the measuring device when the shape judgment criterion is not met as a result in the step (c).

18. A system according to claim 17, wherein the observation device is a scanning electron microscope.

19. A storage medium, readable by a computer, in which a measuring program for measuring a size of a fine pattern is stored, the measuring program comprising steps of:
(a) moving an observation field of an observation device to one measurement area;
(b) imaging a fine pattern present in the one measurement area;
(c) determining whether or not the fine pattern meets a shape judgment criterion;
(d) measuring a size of the fine pattern when the shape judgment criterion is met as a result in the step (c) and thereafter moving the observation field to another measurement area from the one measurement area; and
(e) moving the observation field to another measurement area from the one measurement area without measuring a size of the fine pattern when the shape judgment criterion is not met as a result in the step (c).

20. A storage medium according to claim 19, wherein the observation device is a scanning electron microscope.

* * * * *

UNITED STATES PATENT AND TRADEMARK OFFICE
CERTIFICATE OF CORRECTION

PATENT NO.     : 6,363,167 B1
DATED          : March 26, 2002
INVENTOR(S)    : Miyano et al.

It is certified that error appears in the above-identified patent and that said Letters Patent is hereby corrected as shown below:

<u>Column 12,</u>
Line 26, change "on the based" to -- based --.

Signed and Sealed this

Thirty-first Day of December, 2002

JAMES E. ROGAN
*Director of the United States Patent and Trademark Office*